US008863239B2

(12) United States Patent
Lenoir et al.

(10) Patent No.: US 8,863,239 B2
(45) Date of Patent: Oct. 14, 2014

(54) METHOD OF AND SYSTEM FOR GENERATING AN AUTHORIZED DOMAIN

(75) Inventors: Petrus Johannes Lenoir, Eindhoven (NL); Franciscus Lucas Antonius Johannes Kamperman, Eindhoven (NL); Sebastiaan Antonius Fransiscus Van Den Heuvel, Eindhoven (NL); Robert Paul Koster, Einhoven (NL)

(73) Assignee: Adrea, LLC, Sunnyvale, CA (US)

( * ) Notice: Subject to any disclaimer, the term of this patent is extended or adjusted under 35 U.S.C. 154(b) by 1160 days.

(21) Appl. No.: 10/599,272

(22) PCT Filed: Mar. 15, 2005

(86) PCT No.: PCT/IB2005/050910
§ 371 (c)(1),
(2), (4) Date: Sep. 25, 2006

(87) PCT Pub. No.: WO2005/093544
PCT Pub. Date: Oct. 6, 2005

(65) Prior Publication Data
US 2008/0244706 A1  Oct. 2, 2008

(30) Foreign Application Priority Data
Mar. 26, 2004  (EP) .................................... 04101256

(51) Int. Cl.
*G06F 21/00* (2013.01)
*G06F 21/10* (2013.01)

(52) U.S. Cl.
CPC ........ *G06F 21/10* (2013.01); *G06F 2221/0706* (2013.01)
USPC ..................... 726/4; 726/28; 726/29; 709/217

(58) Field of Classification Search
USPC ....................... 726/2–4, 26–33; 713/182–186; 380/200–201; 709/217–219
See application file for complete search history.

(56) References Cited

U.S. PATENT DOCUMENTS 6,189,146 B1 * 2/2001 Misra et al. .................... 717/177
(Continued)

FOREIGN PATENT DOCUMENTS

WO     WO0059150 A2    10/2000
WO     WO03047204 A2    6/2003
(Continued)

OTHER PUBLICATIONS

Van Den Heuvel et al: "Secure Content Management in Authorised Domains"; International Broadcasting Convention, Sep. 15, 2002, pp. 467-474, XP002273504.
(Continued)

*Primary Examiner* — Joseph P. Hirl
*Assistant Examiner* — John B King
(74) *Attorney, Agent, or Firm* — Finnegan, Henderson, Farabow, Garrett & Dunner LLP (57) ABSTRACT

This invention relates to a system and a method of generating an Authorized Domain (AI)), the method comprising the steps of selecting a domain identifier (Domain ID) uniquely identifying the Authorized Domain, binding at least one user (P1, P2, . . . , $PN_1$) to the domain identifier (Domain ID), and binding at least one device (D1, D2, . . . , DM) to at least one user (P1, P2, . . . , PN1), thereby obtaining a number of devices (D1, D2, . . . , DM) and a number of users (P1, P2, . . . , PN1) that is authorized to access a content item (C1, C2, $CN_2$) of said Authorized Domain (100). Hereby, a number of verified devices (D1, D2, . . . , DM) and a number of verified persons (P1, P2, . . . , PN1) that is authorized to access a content item of said Authorized Domain (100) is obtained. Additionally, it is possible to enable automatic assignment of imported content being imported on a device belonging to the Authorized Domain (AD) since it now is given to which person a given authorized device belongs to. Further, a simple and efficient way of implementing domain boundaries is enabled.

24 Claims, 4 Drawing Sheets

(56) References Cited

U.S. PATENT DOCUMENTS

| | | | |
|---|---|---|---|
| 6,223,291 B1* | 4/2001 | Puhl et al. | 726/28 |
| 7,676,846 B2* | 3/2010 | Robert et al. | 726/27 |
| 2002/0157002 A1* | 10/2002 | Messerges et al. | 713/155 |
| 2003/0018491 A1* | 1/2003 | Nakahara et al. | 705/1 |
| 2003/0076955 A1* | 4/2003 | Alve et al. | 380/201 |
| 2003/0084306 A1* | 5/2003 | Abburi et al. | 713/188 |
| 2003/0093298 A1* | 5/2003 | Hernandez et al. | 705/2 |
| 2003/0097655 A1 | 5/2003 | Novak | |
| 2006/0085352 A1* | 4/2006 | Hug | 705/59 |

FOREIGN PATENT DOCUMENTS

| | | |
|---|---|---|
| WO | WO03098931 A1 | 11/2003 |
| WO | WO2004038568 A2 | 5/2004 |
| WO | WO2005010879 A2 | 2/2005 |

OTHER PUBLICATIONS

International Search Report mailed Aug. 10, 2005 for Application No. PCT/IB2005/050910.

International Preliminary Report on Patentability issued Sep. 26, 2006 for Application No. PCT/IB2005/05910.

European Examination Report dated May 31, 2007 for Application No. 05709017.7.

European Examination Report dated Feb. 13, 2009 for Application No. 05709017.7.

Australian Examination Report dated Jan. 19, 2010 for Application No. 2005225847.

Office Action mailed Mar. 29, 2011, for Japanese Patent Application No. 2007-504536.

Office Action dated May 9, 2011, for Korean Patent Application No. 10-2006-7019672.

Office Action dated Jan. 22, 2014, for Canadian Patent Application No. 2,561,229.

* cited by examiner

METHOD OF AND SYSTEM FOR GENERATING AN AUTHORIZED DOMAIN

The invention relates to a method of generating an Authorized Domain. The invention further relates to a system for generating an Authorized Domain. Further, the invention relates to a computer readable medium having stored thereon instructions for causing one or more processing units to execute the method according to the invention. Additionally, the invention relates to an Authorized Domain and an Authorized Domain that has been generated by the method and/or the system according to the present invention.

In recent years, the amount of content protection systems is growing in a rapid pace. Some of these systems only protect the content against illegal copying, while others are also prohibiting the user to get access to the content. The first category is called Copy Protection (CP) systems. CP systems have traditionally been the main focus for consumer electronics (CE) devices, as this type of content protection is thought to be cheaply implemented and does not need bi-directional interaction with the content provider. Some examples are the Content Scrambling System (CSS), the protection system of DVD ROM discs and DTCP (a protection system for IEEE 1394 connections).

The second category is known under several names. In the broadcast world, systems of this category are generally known as conditional access (CA) systems, while in the Internet world they are generally known as Digital Rights Management (DRM) systems.

A home network can be defined as a set of devices that are interconnected using some kind of network technology (e.g. Ethernet, IEEE 1394, BlueTooth, 802.11b, 802.11g, etc.). Although network technology allows the different devices to communicate, this is not enough to allow devices to interoperate. To be able to do this, devices need to be able to discover and address the functions present in the other devices in the network. Such interoperability is provided by home networking middleware. Examples of home networking middleware are Jini, HAVi, UPnP, AVC.

The concept of Authorized Domains (ADs) aims at finding a solution to both serve the interests of the content owners (that want protection of their copyrights) and the content consumers (that want unrestricted use of the content). The basic principle is to have a controlled network environment in which content can be used relatively freely as long as it does not cross the border of the authorized domain. Typically, authorized domains are centered around the home environment, also referred to as home networks. Of course, other scenarios are also possible. A user could for example take a portable device for audio and/or video with a limited amount of content with him on a trip, and use it in his hotel room to access or download additional content stored on his personal audio and/or video system at home. Even though the portable device is outside the home network, it is a part of the user's authorized domain. In this way, an Authorized Domain (AD) is a system that allows access to content by devices in the domain, but not by any others.

For a more extensive introduction to the use of an Authorized Domain, etc., see S. A. F. A. van den Heuvel, W. Jonker, F. L. A. J. Kamperman, P. J. Lenoir, Secure Content Management in Authorised Domains, Philips Research, The Netherlands, IBC 2002 conference publication, pages 467-474, held at 12-16 Sep. 2002.

Various proposals exist that implement the concept of authorized domains to some extent.

One type of previous solutions include device based Authorized Domains (ADs). Examples of such systems are SmartRight (Thomson Multimedia), xCP, and NetDRM (Matshushita). A further example of a device based AD is e.g. given in International Patent Application Publication No. WO2003098931.

In typical device based ADs, the domain is formed by a specific set of devices and content. Only the specific set of devices of the domain is allowed to access, use, etc. the content of that domain. There is not made any distinction of the various users of the specific set of devices.

A drawback of device based AD systems is that they typically do not provide the typical flexibility that a user wants or need, since users are restricted to a particular and limited set of devices. In this way, a user is not allowed to exercise the rights that the user has obtained anytime and anywhere he chooses. For example, if a user is visiting a friend's house he is not able to access his legally purchased content on the friend's devices as these devices would not typically be part of the particular and limited set of devices forming the domain comprising the user's content.

Another type of previous solutions is person based Authorized Domains, where the domain is based on persons instead of devices as was the case for device based ADs. An example of such a system is e.g. described in International Patent Application Publication No. WO2004038568, in which content is coupled to persons which then are grouped into a domain.

In a typical person based AD access to content bound to that AD is allowed by only a specific and limited set of users, but e.g. using any compliant device. Person based Authorized Domains typically offer easier domain management compared to device based ADs.

However, person based systems require person identification which is not always convenient or preferred by users. Further, a visitor to your home may want to access your content. As he does not have a person id device for that domain it is not possible for him to access content. It would be preferred if devices in the home belonging to the domain could enable access of domain content by the visitor.

Therefore there is a need for a hybrid person and device based authorized domain having the individual advantages of each system. Such a hybrid person and device based authorized domain is proposed in European patent application serial number 03102281.7. In that application an Authorized Domain (AD) is proposed which combines two different approaches to define an AD. The connecting part between the device and the person approach is a Domain Identifier. The devices are preferably grouped together via a domain devices certificate (DDC), while the persons preferably are separately grouped via a domain users certificate (DUC) and where content is directly or indirectly linked to a person. A schematic representation of such an Authorized Domain (AD) can be seen in FIG. 1, and will be explained in greater detail in the following.

However, this AD has the disadvantage that when content is imported into the domain (an action typically done on a device), e.g. from a delivery DRM and/or CA system, it is not directly clear to which person the content has to be attributed. In other words, at the moment of import, the system needs additional information of whom it must link the content to. Therefore there is a need for a simple implementation where the information to whom belongs content imported in the domain is easily and/or directly obtainable.

An additional problem is that no simple and effective domain boundary is available. In prior art systems/methods, domain boundaries are typically defined by a maximum number of devices, a limited number of sessions, etc., which are either technically difficult to implement or easy to implement but then do not provide the desired characteristics of a domain boundary. An example of the first is e.g. letting all persons to a household be in the domain wherever they are using any device they possess. Setting a limit for the number of devices or sessions in the domain gives the disadvantage that this approach does not scale with the number of users using the Authorized Domain (AD). Therefore there is a need for a simple and more scalable implementation of the domain boundary.

It is an object of the invention to provide a method and corresponding system for providing/generating an Authorized Domain structure based on both persons and devices that solves the above-mentioned shortcomings of prior art. A further object is to provide this in a simple, flexible and efficient way.

These objects, among others, are achieved by a method (and corresponding system) of generating an Authorized Domain as claimed in claim 1.

In this way, a number of verified devices and a number of verified persons that is authorized to access a content item of said Authorized Domain are obtained. Additionally, it is possible to enable automatic assignment of imported content being imported on a device belonging to the Authorized Domain (AD) since it now is given to which person a given authorized device belongs to.

Further, a simple and efficient way of implementing domain boundaries is enabled, since the domain boundaries may be coupled to users only (as now both devices and content are coupled to users). In this way, the domain boundary becomes less rigid and scales better.

Additionally, a simple and efficient way of grouping devices and persons to an AD is obtained. Further, a hybrid device and person based Authorized Domain is provided. In this way, access is enabled to a content item of an authorized domain by a user operating a device either by verifying that the owner of a content item and the user is linked the same domain or by verifying that the owner of the device and the owner of the content item is linked to the same domain. Thereby, enhanced flexibility for one or more users when accessing content in an authorized domain is obtained while security of the content is still maintained. This is further done in a simple, secure and reliable way.

In one embodiment,
each device may be bound to only a single user, or
each device may be bound to several users, where one user is indicated as a primary user for that particular device.

In one embodiment, the method further comprises the step of:
importing, on a given device, at least one content item into the Authorized Domain given by the domain identifier by
automatically binding, by default, the at least one imported content item to the single user that the given device is bound to or to the user (P1, P2, ..., $PN_1$) indicated as primary user for the given device, or
binding the at least one imported content item to another user using additional information, when non-default binding is to be used.

In one embodiment, the method further comprises
providing an Authorized Domain size limitation, where the limitation relates to a maximum number of users.

Further, a limit can be put on the maximum number of devices per user, thereby making the total number of devices in the domain dependent on the number of users.

In one embodiment, the method further comprises
using a user identification device as a personal Authorized Domain manager, and/or
using a personal mobile device as a personal Authorized Domain manager, and/or
using a mobile phone as a personal Authorized Domain manager, and/or
using a PDA (personal digital assistant) as a personal Authorized Domain manager.

In one embodiment, the step of binding at least one user to the domain identifier comprises:
obtaining or generating a Domain Users List comprising the domain identifier and a unique identifier for a user thereby defining that the user is bound to the Authorized Domain.

In one embodiment, the step of binding at least one device to at least one user comprises
obtaining or generating a Device Owner List comprising a unique identifier for a user and a unique identifier for each device belonging to the user thereby defining that the at least one device is/are bound to the user.

or in that the step of binding at least one device to at least one user comprises
obtaining or generating a Device Owner List for each device to be bound, the Device Owner List comprising a unique identifier for a user and a unique identifier for a device belonging to the user thereby defining that the device is bound to the user.

In one embodiment, the step of binding at least one content item to the Authorized Domain comprises:
binding a content item to a User Right, where said User Right is bound to a user bound to the Authorized Domain.

In one embodiment, the User Right comprises rights data representing which rights exists in relation to the at least one content item bound to the User Right.

In one embodiment, the method further comprises the step of controlling access, by a given device being operated by a given user, to a given content item, the step comprising:
checking whether a user, the given content item is linked to, and a user, the given device is linked to, belongs to the same Authorized Domain, and allowing access for the given user and/or other users via the given device to the content item if so,
and/or
checking if the given content item is linked to a user belonging to the same Authorized Domain as the given user, and allowing access for the given user via the given device and/or other devices to the content item if so.

In one embodiment, the method further comprises the step of controlling access, by a given device being operated by a given user, to a given content item being bound to the Authorized Domain and having a unique content identifier, comprising:
checking if the Domain User List of the Authorized Domain comprises both a first user identifier, comprised in a Device Owner List comprising an identifier of the given device, and a second user identifier, linked to the given content item, thereby checking if the user bound to the given device is bound to the same Authorized Domain as the user bound to the content item, and
allowing access to the given content item by the given device operated by any user
and/or
checking if the Domain User List of the Authorized Domain, that the content item is bound to, comprises a user identifier of the given user thereby checking if the given user is bound to the same Authorized Domain as the content item, and
allowing access to the given content item by any device including the given device operated by the given user.

In one embodiment, the step of controlling access of a given content item further comprises:

checking that the User Right for the given content item specifies that the given user has the right to access the given content item and only allowing access to the given content item in the affirmative.

In one embodiment, every content item is encrypted and that a content right is bound to each content item and to a User Right, and that the content right of a given content item comprises a decryption key for decrypting the given content item.

In one embodiment, the Domain Users List (DUC) is implemented as or included in a Domain Users Certificate, and/or the Device Owner List (DOC) is implemented as or included in a Device Owner Certificate, and/or the User Right is implemented as or included in a User Right Certificate.

Advantageous embodiments of the present invention are defined in the claims and described in detail in the following. The embodiments of the system correspond to the embodiments of the method and have the same advantages for the same reasons.

Further, the invention also relates to a computer readable medium having stored thereon instructions for causing one or more processing units to execute the method according to the present invention.

The invention also relates to an Authorized Domain (AD) that has been generated by the method or by the system according to the present invention.

These and other aspects of the invention will be apparent from and elucidated with reference to the illustrative embodiments shown in the drawings, in which:

FIG. 5 illustrates an exemplary (partial) data structure of a content container, a content right (CR) and a user right certificate (URC) according to the embodiment of the present invention shown in FIG. 2a;

Throughout the figures, same reference numerals indicate similar or corresponding features. Some of the features indicated in the drawings are typically implemented in software, and as such represent software entities, such as software modules or objects.

Figure 1:
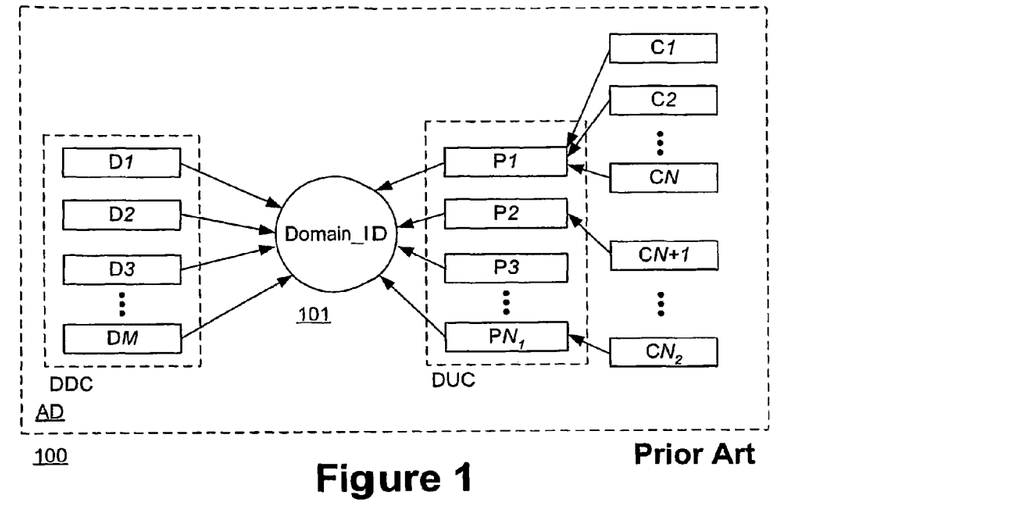
FIG. 1 schematically illustrate a hybrid device and person based Authorized Domain (AD) according to prior art.

FIG. 1 schematically illustrate a hybrid device and person based Authorized Domain (AD) according to prior art. Such a hybrid device and person based authorized domain is disclosed in European patent application serial number 03102281.7. Shown are an authorized domain (100) where a number of devices D1, D2, D3, . . . , DM (where M is equal to or larger than 1), a number of content items C1, C2, C3, . . . , $CN_2$ (where $N_2$ is equal to or larger than 1) and a number of persons/users P1, P2, P3, . . . , $PN_1$ (where $N_1$ is equal to or larger than 1) is bound to the AD. Please note that M, N1 and/or N2 may initially or at some time later be 0 in some states. The devices, persons, and content items have been bound to the domain (100) via a domain identifier (Domain_ID) (101). The content items (C1, C2, C3, . . . , $CN_2$) are connected to the users (P1, P2, P3, . . . , $PN_1$) via user rights (URC1, . . . $URCN_2$) (not shown), where preferably one content item is associated with one user right certificate specifying which rights a given person (or alternatively a given group of persons and/or all persons bound to the domain (1000 have in relation to the specific content item (or alternatively, several or all content items in the domain (100)). In another embodiment of European patent application serial number 03102281.7, the content items (C1, C2, C3, . . . , $CN_2$) are connected to the Domain Identifier (101) via one or more Domain Rights (DRC) (not shown), e.g. implemented as a certificate.

For more information on an authorized domain architecture and implementation options, the reader is referred to International Patent Application Publication No. WO2003047204 or International Patent Application Publication No. WO2003098931. The latter application more specifically describes an implementation in which content and devices are coupled to a domain. Additionally, International Patent Application Publication No. WO2004038568 describes an implementation in which content is coupled to persons which then are grouped into a domain.

Authorized devices are preferably bound to the AD (100) by a certificate. Likewise authorized persons/users are preferably also bound to the AD (100) via certificates. Content items are, in this particular embodiment, bound to a person by means of a user right certificate (URC). This user right certificate enables the use of a corresponding content right (CR) that preferably contains a cryptographic key for accessing the content, as will be explained in greater detail in connection with FIG. 5. A user right certificate (URC) is typically linked with one content item, but could also be linked with multiple content items. An exemplary partial data structure of a content container (contains a content item), a URC, and a CR are shown and explained in greater detail in connection with FIG. 5.

Domain certificates are preferably issued by a domain authority. Alternatively, compliant devices with domain management capabilities can manage these certificates.

In the specific example shown in FIG. 1, each content item C1, C2, . . . , CN is coupled (via URC(s)) to person P1, $C_{N+1}$ is coupled to person P2, and where $C_{N+2}$-$C_{N2}$ are distributed among person(s) P3-$PN_1$.

A given content item is preferably only allowed to be coupled to a single URC (indirectly via a content right) and thereby a single person. If several users needs a copy of the same content item it would in this embodiment be present once for each user and treated as different content items, which make rights management simpler. Alternatively and just as applicable, a given content item could be coupled to multiple persons, as a CR can be linked to multiple URCs.

Persons P1, P2, . . . , $PN_1$ and Domain devices D1, D2, . . . , DM are then grouped into forming the authorized domain (100).

The binding, i.e. grouping and coupling, of devices, persons and content is done by the use of certificates. Preferably, a Domain Devices Certificate or Domain Devices List (DDC), a Domain Users Certificate or Domain Users List (DUC), and a User Right Certificate or User Right List (URC)

are used. In the following reference is only made to certificates, although it is to be understood that such structures may e.g. be implemented as lists or the like instead.

The DDC lists the device(s), which are part of the domain (100), e.g. by comprising for each device a unique identifier. The DUC lists the user(s), which are part of the domain, e.g. by comprising a unique identifier or a (e.g. public) cryptographic key or a hash thereof for each user. The URC preferably exist for each content item (so in FIG. 1 there are $N_2$ URCs) and indicates which rights the user (that the URC is linked to) has (and/or does not have) within the domain (100), and optionally a cross domain (X-AD rights), for the given content item linked to the URC. Alternatively, an URC coupled to a given user e.g. lists each content item that is coupled to the given user and what rights the given user has in relation to each coupled content item. Alternatively, only a single URC is used specifying the rights for every user, i.e. which content item(s) each user has coupled to him/her and what rights the user has (and/or does not have).

The DDC and DUC are associated with each other by means of a Domain Identifier (Domain_ID) (101) contained in both certificates.

In the prior art, if a specific device (e.g. device D3) wants to access a certain piece of content (e.g. content C1) it has to be proved or checked, etc. (using the certificates) that the certain piece of content is coupled to a specific person (e.g. person P1) that is a member of the same domain (100) as the specific device. This may e.g. by done by checking that an (unique) identifier of the specific device (e.g. device D3) is part of the DDC, that an (unique) identifier of the specific person (e.g. person P1) is part of the DUC, that both the DDC and DUC comprises the same Domain Identifier (e.g. Domain_ID=4 or Domain_ID=8 byte value (e.g. generated randomly); not shown), and that the URC for the specific person (e.g. URC1) specifies that the specific person has the right to access the certain piece of content (e.g. if it is within the validity period of his license or have not been used more than three times, etc.). Alternatively, the Domain ID may instead of being a random number be a reference to a data object e.g. a domain certificate.

However, this AD has the disadvantage that when content is imported into the domain (an action typically done on a device), e.g. from a delivery DRM and/or CA system, it is not directly clear to which person the content has to be attributed. In other words, at the moment of import, the system needs additional information of whom it must link the content to.

Further, no simple and effective domain boundary is available. Domain boundaries are typically defined by a maximum number of devices, a limited number of sessions, etc., which are either technically difficult to implement or easy to implement but then do not provide the desired characteristics of a domain boundary. An example of the last is e.g. letting all persons to a household be in the domain wherever they are using any device they possess. Such a domain boundary is not useful. Additionally, setting a limit for the number of devices or sessions in the domain gives the disadvantage that this approach does not scale with the number of users using the Authorized Domain (AD).

Figure 2A:
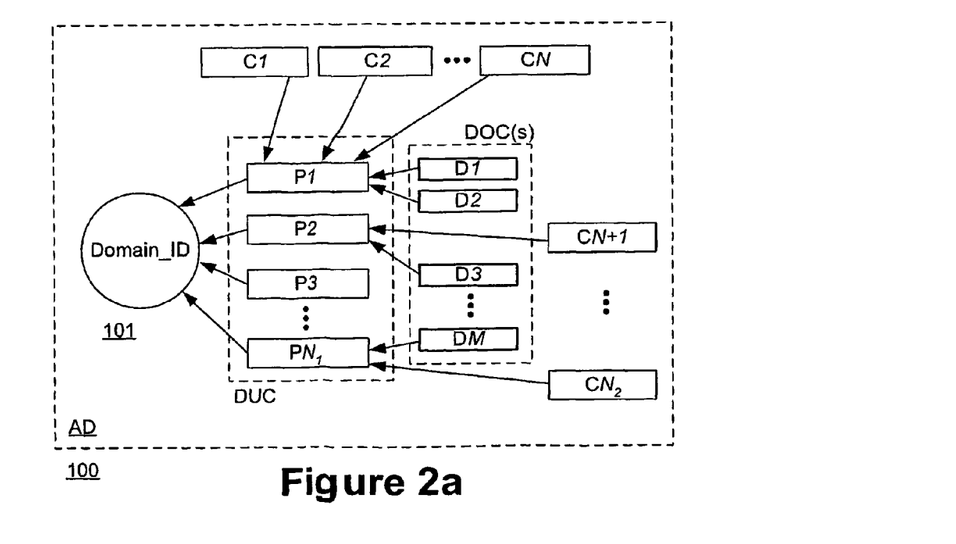
FIG. 2a schematically illustrate a hybrid device and person based Authorized Domain (AD) according to the present invention.

FIG. 2*a* schematically illustrates a hybrid device and person based Authorized Domain (AD) according to the present invention. Shown is an Authorized Domain (AD) corresponding to the one shown in FIG. 1 with exceptions as explained in the following. Instead of linking authorized devices of the domain directly to the domain identifier (Domain_ID) (101), as in FIG. 1, devices are now linked to persons, or more specification, each device is linked to a person that has ownership over the particular device. In the shown embodiment, each device is linked only to a single person, whereby the ownership of the device is easily reflected. Alternatively, each device may be linked to more than one person.

Shown is an Authorized Domain (AD) (100) where a number of persons/users (P1, P2, . . . , $PN_1$) are bound to a domain identifier (Domain_ID) (101), as explained in connection with FIG. 1. Further, a number of content items (C1, C2, C3, . . . , $CN_2$) is linked to the users, as explained in connection with FIG. 1.

In the specific example shown in FIG. 2*a*, content item C1, C2, . . . , CN is coupled (preferably via URC(s) as explained in greater detail in connection with FIG. 2*b*) to person P1, $C_{N+1}$ is coupled to person P2, and $C_{N+2}$-$C_{N2}$ are distributed among person(s) P3-$PN_1$.

According to the present invention, a number of authorized devices (D1, D2, D3, . . . , DM) (where M is equal to or larger than 1) is are bound to the users of the Authorized Domain (AD) (100), where the binding reflects that a given user has ownership of the bound device. Preferably, authorized devices are bound to the users (and thereby the AD (100)) by a Device Owner Certificate (DOC), list or other suitable structure. In one embodiment, a DOC exists for each device (as described in connection with FIG. 3*a*) defining which user (or users) has ownership of the given device. Alternatively, a DOC exist for each person (as described in connection with FIG. 3*b*) defining which devices within the domain that user has ownership over. In yet another alternate embodiment, device may indicate to whom it belongs, e.g. by providing a DOC, list or other suitable structure.

In the specific example shown in FIG. 2*a*, device D1 and D2 are coupled to user P1, D3 is coupled to user P2, and D4-DM are distributed among users(s) P3-$PN_1$.

As mentioned, the user right (URC1, . . . , $URCN_2$) is a single connection, binding, coupling etc. between one user and a content right (which is required to decrypt a piece of content). Therefore we now have five main entities in our system that could work as follows:

content (C1, C2, C3, . . . , $CN_2$): content items are preferably encrypted (there are many options, for example with a unique key per content title) and can be anywhere in the system; a content item is in this and later embodiments linked indirectly to a user right certificate (URC) via a content right (CR), as explained in connection with FIG. 5.

content right (CR; not shown; see e.g. FIG. 5): contains cryptographic key(s) or other suitable protection means to access a certain (encrypted/protected) content item. The system is flexible in the sense that content rights can be made unique per content title or even unique per specimen (copy) of content. Content rights should be only transferred to compliant devices. A more secure rule is to enforce that content rights may be only transferred to compliant devices that are operated by authorized users (i.e. users that are authorized to have access to the specific content right by means of their user rights). Content rights might also be stored together with the content on for example an optical disk. However, content rights must be stored securely since they contain the content decryption key.

user right certificate (URC1, . . . $URCN_2$; not shown; see e.g. FIG. 2*b*): a certificate, list, data structure or the like issued by the content provider that authorizes a person to use a certain content right (CR) (belonging to a certain piece of content). User rights can in principle be anywhere in the system. Preferably, a user right certificate also comprise rules (e.g. restricted to viewers 18 years or older, European market only, etc.) describing the allowed access to a certain content item.

device (D1, D2, D3, ..., DM): a device that is used to play, operate, record, present, display, modify, etc. a content item. Additionally, a (compliant) device can also preferably identify a user by means of a personalized identification device (e.g. such as a smart-card, a mobile phone, a biometric sensor, etc.) and collect certificates (e.g. from the smartcard, or from other devices) that prove that the user is allowed to use a certain content right. This content right could be obtained from the smart-card where it was stored (if it was stored there), or be obtained (securely transferred) from another compliant device on a network.

user/person (P1, P2, P3, ..., $PN_1$): A user is identified by some biometric or preferably by a personalized identification device (e.g. a smartcard, mobile phone, a mobile phone containing a smartcard or other types of devices that uniquely identifies a user) that he/she is wearing, carrying or has access to. A mobile phone comprising a smart card or another device having storage means is preferred since it allows users to carry rights with them (for accessing content on off-line devices). The identification device may itself be protected by a biometric authentication mechanism, so that anyone other than the legitimate owner cannot use the identification device. A user may also be identified using public key technology or zero-knowledge protocols or a combination thereof.

Please note that in practice content can only be accessed/ used by means of a user operating a device. In the following text we assume that devices used in the system are compliant and "public" devices. This means that a device will adhere to certain operation rules (e.g. will not illegally output content on an unprotected digital interface) and that ownership of a device is not important (public). Device compliance management, i.e. compliant device identification, renew-ability of devices, and revocation of devices, will be assumed to be in place (using known techniques), and will not be considered further here.

By having the content items coupled to persons (e.g. via URCs) the ownership of content is easily reflected. Additionally, it is easier to administer a split of the AD, since by splitting the persons the appropriate content items is also split, since the content items are linked to persons.

Hereby, one or more persons, one or more devices (via a person), and at least one content item (via a person) are linked together in the domain preferably with the use of certificates or alternatively with the use of lists or other suitable structures comprising the same described elements as for the certificates. It may be possible for the domain to comprise zero persons and/or zero devices and/or zero content items during some points. E.g. when initially building the domain it may comprise zero content items or zero devices bound to the domain, etc.

In this way, a user that has been verified as belonging to the same domain as the content item being accessed may access the specific content using any device. Additionally, a user that is using a device that has been verified as belonging to the same domain as the content item being accessed may access the specific content using that specific device. Further all users may access the specific content item on that specific device.

This gives enhanced flexibility for one or more users when accessing content in an AD while security of the content is still maintaining.

Further, during import of new content items it is now possible to automatically assign the newly imported content to the person to whom the device used for import belongs to, since the devices in the Authorized Domain (AD) now are coupled to persons. So now, it is not necessary to obtain and handle additional information relating to who imported content must be linked to. In a preferred embodiment, it is possible to override or sidestep this automatic assignment and still use additional information to assign the content to another person within the Authorized Domain (AD). In the embodiment where a given device may be linked to multiple persons, a 'primary' person and one or more 'secondary' persons may be designated where the default automatic binding of an imported content item (C1, C2, $CN_2$) is done to the user (P1, P2, ..., $PN_1$) that is designated primary person of the given device (D1, D2, ..., DM) used during import.

Additionally, a simple and efficient way of implementing domain boundaries is enabled, since the domain boundaries may be coupled to users only (as now both devices and content are coupled to users). In effect, an Authorized Domain (AD) size limitation is provided, where the limitation relates to a maximum number of users instead of a maximum number of devices or a maximum number of sessions. Further, a limit can be put on the maximum number of devices per user, thereby making the total number of devices in the domain dependent on the number of users.

It is also to be understood that instead of having one list or certificate comprising users (i.e. the DUC) and one list or certificate comprising devices (i.e. DOC) above and in the following other arrangements may also be used. As an alternative, both devices and users could be comprised in a single list/certificate. Further, several lists/certificates comprising devices and/or several lists/certificates comprising users and/ or combinations thereof may be used just as well.

Figure 2B:
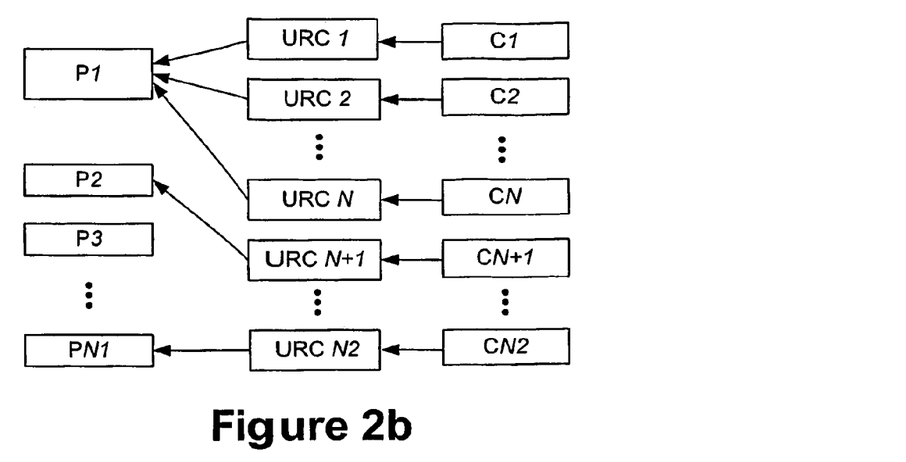
FIG. 2b illustrate how each content item is linked to persons via a user right according to one embodiment of the present invention.

FIG. 2b illustrate how each content item is linked to persons via a user right according to one embodiment of the present invention.

The content items (C1, C2, C3, ..., $CN_2$) are connected to the users (P1, P2, P3, ..., $PN_1$) via user rights (URC1, ... $URCN_2$) (not shown), where preferably one content item is associated with one user right certificate specifying which rights a given person (or alternatively a given group of persons and/or all persons bound to the domain) have in relation to the specific content item (or alternatively, several or all content items in the domain).

In the shown example, content C1, ..., CN are connected to user right URC1, ..., URC N, respectively, which all are connected to user P1, content C N+1 is connected to user right URC N+1 connected to user P2, while content C N+2, ..., C N2 is connected to user rights URC N+2, ..., URC N2, which are distributed among users P4, ..., PN1.

The user right (URC1, ... $URCN_2$) is preferably a certificate, list, data structure or the like issued by the content provider that authorizes a person to use a certain content right (CR) (belonging to a certain piece of content). User rights (when implemented as a certificate) can in principle be anywhere in the system. Preferably, a user right certificate also comprise rules (e.g. restricted to viewers 18 years or older, European market only, etc.) describing allowed access to a certain content item.

Figure 3A:
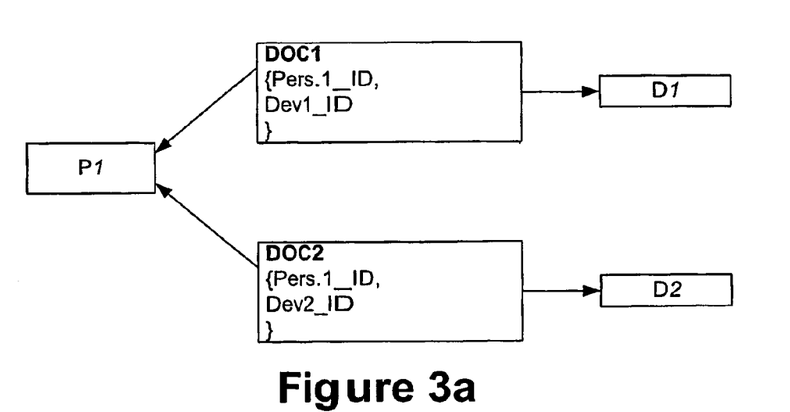
FIG. 3a schematically illustrate the coupling between users and devices according to a first aspect of the present invention.

FIG. 3a schematically illustrate the coupling between users and devices according to a first aspect of the present invention. Shown are two Device Owner Certificates (DOC1, DOC2) each linked (as indicated by the arrows) to the same person/user, namely user P1. Further, DOC1 is linked to authorized device D1, while DOC2 is linked to authorized device D2 (as indicated by the arrows). This reflects in a very simple and reliable way that user P1 has ownership of devices D1 and D2. So when device D1 or D2 is used to import content into the Authorized Domain (AD) (e.g. by user P1 or another user), then it is possible to automatically assign the imported content to user P1. If the content should be assigned to another user it is preferably possible to override the automatic assignment.

In this embodiment, a DOC exists for each device. Each DOC in this particular embodiment comprises a unique identifier (Dev1_ID or Dev2_ID) of the given device and a unique identifier of the user (Pers.1_D) that the given device belongs to.

In a preferred embodiment, the device identifier for a given device, e.g. Dev1_ID, is an (un-changeable at least by users) serial or ID number, etc. The person/user identifier could e.g. be an ID or serial number for a given person, a name, a hash value of a public key of the user or in general any unique identifier of a person. A user may e.g. identified by some biometric or preferably by a personalized identification device (e.g. a smartcard, mobile phone, a mobile phone comprising a smartcard or other types of devices that uniquely identifies a user) that he/she is wearing, carrying or has access to. A mobile phone comprising a smart card or another device having storage means allows users to carry rights with them (for accessing content on off-line devices). In a networked environment, it is not required that the user carries the rights with him. The identification device may itself be protected by a biometric authentication mechanism, so that anyone other than the legitimate owner cannot use the identification device. A user may also be identified using public key technology or zero-knowledge protocols or a combination thereof.

The DOC is in one embodiment managed by a smartcard (e.g. acting as a person/user identification device). In this way, the smartcard acts as an AD management enabled device. In this case, the person private key is used to sign such certificates. Alternatively, an AD compliant device with AD management capabilities could manage such certificates, which however, would require further security measure.

Figure 3B:
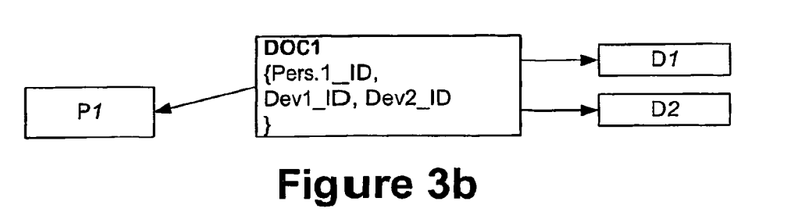
FIG. 3b schematically illustrate the coupling between users and devices according to a second aspect of the present invention.

FIG. 3b schematically illustrate the coupling between users and devices according to a second aspect of the present invention. Shown are a single Device Owner Certificates (DOC1) linked (as indicated by the arrows) to the person/user P1. Further, DOC1 is linked to both authorized device D1 and to authorized device D2 (as indicated by the arrows). This reflects in a very simple and reliable way that user P1 has ownership of devices D1 and D2. In this embodiment, a DOC exists for each user. Each DOC in this particular embodiment comprises a unique identifier (Dev1_ID, Dev2_ID) for each device and a unique identifier of the user (Pers.1_ID) that the given device(s) belongs to.

Alternatively, DOCs as described both in connection with FIGS. 3a and 3b may be used in combination.

Figure 4:
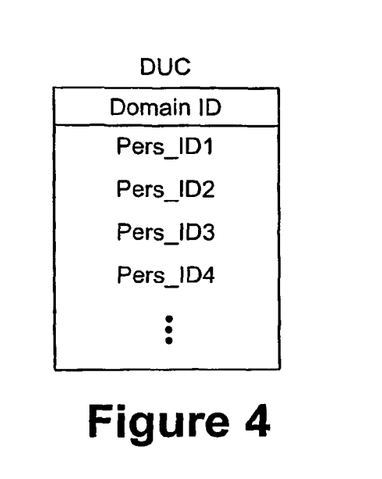
FIG. 4 schematically illustrate the elements of a Domain Users Certificate (DUC)

FIG. 4 schematically illustrate the elements of a Domain Users Certificate (DUC). The Domain Users Certificate (DUC) comprises a listing of unique identifiers (Pers_ID1, Pers_ID2, ...) for one or more users/persons belonging to the given domain, i.e. being authorized users in the domain. The given domain that the listed users are authorized within is specified by the value of the Domain ID. A Domain Users Certificate (DUC) is linked to the Domain ID and thereby defines the authorized domain that comprises both devices and users, since devices are linked to users, as described above e.g. in connection with FIGS. 3a and 3b.

Certificates according to the present invention (DOC, DUC, etc.) could e.g. be implemented by well-known authorization certificate. Additionally, one useful option is to put a Domain_ID in a holder field of such a certificate implementing the DOC and/or the DUC.

Figure 5:
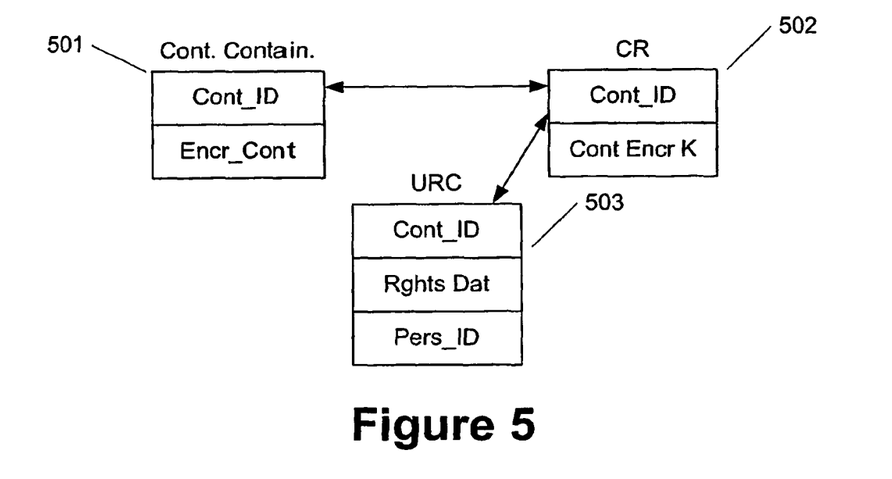

FIG. 5 illustrates an exemplary (partial) data structure of a content container, a content right (CR) and a user right certificate (URC) according to the embodiment of the present invention shown in FIG. 2a. Shown is a content container (501) which contains protected data/content (Encr_Cont) e.g. obtained from a Service Provider. The content container further comprises a content identifier (Cont_ID) unique for the particular content item embedded in the content container. In this way, the content identifier (Cont_ID) is used to locate a given content item of the domain, e.g. by searching every content container belonging to the specific domain for a matching Cont_ID.

Also shown is a content right (CR) (502) comprising a content identifier (Cont_ID) and a content encryption key (Cont Encr K). The content identifier is used to establish a link to the encrypted content item (in a content container) that the content encryption key is for, i.e. the content that the key is needed to de-crypt and thereby enable access to. In this particular embodiment, the encryption key is a symmetrical key, i.e. the same key is used to both encrypt and decrypt data. Alternatively, other secure schemes may be used.

Further shown is a user right (UR)/User Right Certificate (URC) (503). The URC comprises a content identifier (Cont_ID) used for linking a specific content item (and content right) with a specific URC. The URC also comprises a person/user identifier (Pers_ID) that indicates which person the specific content is bound to. The person/user identifier could e.g. be an ID or serial number for a given person, a name, a hash value of a public key of the user or in general any unique identifier of a person.

Further, the URC comprises rights data (Rghts Dat) that define what the given user (as identified by the Pers_ID) is allowed to do in relation with the specific content item (contained in the content container comprising the same Cont_ID). These rights data may e.g. specify play rights (e.g. restricted to viewers 18 years or older, European market only, etc.), one-generation copy rights, a validity period, not used more than three times etc. Further, the rights data (Rghts Dat) may also define what all users are allowed to do in relation with the specific content item (which may be the same or different than the rights of the person identified by Pers_ID).

To illustrate the use of a content container, a content right (CR) and a user right certificate (URC) according to the present invention consider the following example illustrating access to a given content item by a given user on a given device.

The content identifier (Cont_ID) for the given content item that the user wants to access and the person identifier (Pers_ID) of the given user are obtained. The person identifier may e.g. be obtained on the basis of a personalized identification device (e.g. a PDA, a smart card, mobile phone, a mobile phone containing a smartcard, a biometric sensor, etc. or in another way). The content identifier may e.g. be obtained on the basis of a file name, the selection of a file, from a header of the content container, etc.

It is checked if the content item and the user belong to the (same) Authorized Domain. Checking whether a user belongs to a domain is done by checking if the person identifier (Pers_ID) is comprised in a Domain Users Certificate (DUC) (shown in FIGS. 2a and 4). If so, then it has been verified that the user is part of the domain and is allowed to access content also being a part of the same domain.

Then it is checked whether the given content item also belongs to the same domain, by checking if the content identifier of the content item is bound to a person bound to the same domain, i.e. by checking whether there exist a URC bound to the domain that comprises the same content identifier. If so, then the content item belongs to the same domain and the user (given that the user and/or the device that is used have been verified) therefore has the right to access it. Further, the rights data (Rghts Dat) of the URC may also specify a restricted access to the content item. The rights data may specify rules, rights, conditions for the person identified with Pers_ID and/or rules, rights, conditions in general. For example, it could specify that that every user in the domain has play rights while the user linked via Pers_ID in addition has exclusive first generation copy rights. In effect, it is checked if the given content item is linked to a user belonging to the same Authorized Domain (AD) as the given user, and allowing access for the given user via the given device and/or other devices to the content item if so.

Usually, the user will obtain access to the content item using a specific device. If the user is not part of the domain or no valid user ID can be obtained (e.g. because it is a friend accessing the content), then it has to be checked whether the specific device that the user is using to access the content item is part of the same domain as the content item in order to allow the user to access the content item, since he is not (or it can not be established that he is) part of the same domain as the content item. I.e. the device used for access has to be an authorized device within the same domain as the content item being accessed. This is done by obtaining the Pers_ID of the URC that the content item was bound to, i.e. the content owner of the content item being accessed is determined. Here and in the following, content owner is meant as content owner within the domain and not the entity that has the right to assigns rights, such as authors, music labels, film studios, etc. In effect, it is checked whether a user, the given content item is linked to, and a user, the given device is linked to, belongs to the same Authorized Domain (AD), and allowing access for the given user and/or other users via the given device to the content item if so.

Then the device identifier (Dev_ID) of the given device being used to access the content is obtained. The obtained device identifier (Dev_ID) is used to determine the user that the device belongs to. This is done by determining which DOC (shown in FIGS. 2a, 3a and 3b) comprises the device identifier and retrieving the user identifier (Pers_ID) enclosed therein, i.e. this determines the device owner.

Then it has to be checked whether the content owner and the device owner are part of the same domain. This is done by checking whether the DUC comprising the domain identifier (Domain_ID) contains the user identifier (Pers_ID) of both the content owner and the device owner. If this is the case; then the user (and all other users) may use the specific device to access the specific content (and all other content of that domain).

These three steps of validating access to the content item, the user and the device may alternatively be done in another order than the one described and e.g. also in parallel at least to a certain extent.

After it has been verified that the current user and the user that the content item being accessed belongs to and/or that the user that the device belongs to and the user that the content belongs to is part of the same domain as the content, then the obtained content identifier is used to locate the content right (CR) of the specific content item being accessed in order to obtain the cryptographic key that has to be used to decrypt the encrypted content item. Further, the content container comprising the encrypted content item is also located using the content identifier.

Finally, the key in the content right (CR) is used to decrypt the content item which is now accessible, e.g. for rendering, copying on an optical disk, editing, etc. Alternatively, the content item may also be decrypted using the content right before sending it to the device for access, whereby only the content item needs to be transmitted. However, this requires special measures in order to protect the content item during transfer so that it is not possible to 'leak' the unprotected content.

This process is illustrated in FIG. 5 by the arrows linking the Cont_ID of the various structures.

In this way, if a specific user that has been verified as belonging to the same domain as the content item being accessed then there is, as mentioned, no need for checking whether the device he is using also belongs to the same domain. Further, the validated user may access the specific content item using all devices. Likewise, if a specific device has been verified as belonging to the same domain as the content item being accessed, then all users may access the specific content item using that specific device and there is no need to verify the user.

Therefore, enhanced flexibility for one or more users when accessing content in an AD is obtained while security of the content is still maintaining.

Figure 6:
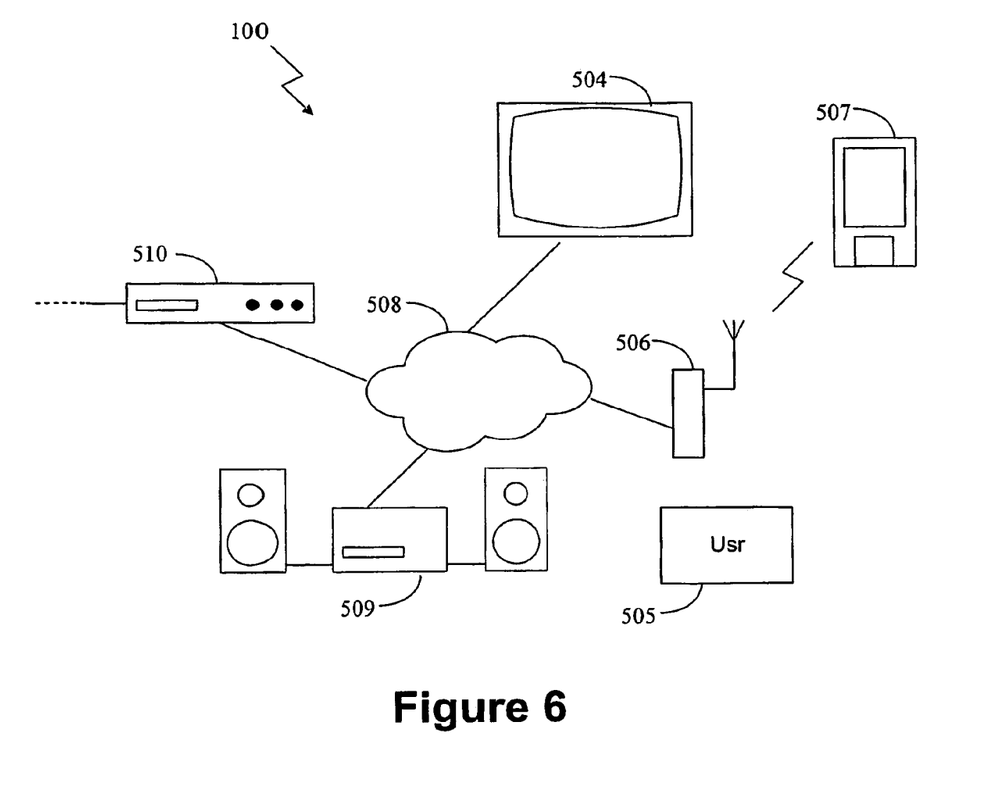
FIG. 6 schematically illustrate an exemplary system comprising devices and persons forming an authorized domain (AD).

FIG. 6 schematically illustrate an exemplary system comprising devices and persons forming an authorized domain (AD). Shown is network (508) that enables communication between a number of devices e.g. in a household. Devices in the example is a television set (504), a digital video system (510), a music set (509) and a portable device (507) that is in wireless communication with the network (508) via a wireless access point (506). Further schematically shown is a user/person (505).

In one exemplary scenario, an Authorized Domain (100) has the user (505) bound to it in addition to the television set (504), the digital video (510), the music set (509) and a number of content items (not shown) (all bound according to FIG. 2a via persons/users).

In this scenario, the user wants to access a given content item on the portable device (507). He may be located the same place as the devices or at another place (e.g. in a hotel room). For a user to obtain access to the content item according to the invention, it has to be checked that the person (505) belongs to the same domain (100) as the content owner since the portable device (507) does not. This may be done by uniquely identifying the user e.g. using a smart card reader, e.g. in the portable device (507), which then may transfer the User ID to the network (508). The content right and the content item is assumed to be on the portable device (507) (otherwise it may be transmitted there). The user is then checked as described in connection with FIG. 5. After validation of the user, then the content item may be accessed.

In another exemplary scenario, an Authorized Domain (100) has the television set (504), the digital video (510), the music set (509) and the portable device (507) bound to it in addition to a number of content items (not shown) (all bound according to FIG. 2a via persons/users). The user (505) is in this scenario not bound to the Authorized Domain (100) as he e.g. may be a neighbor or friend visiting. In this scenario, the user also wants to access a given content item on the portable device (507).

For a user to obtain access to the content item according to the invention, it has to be checked that the owner of the portable device (507) belongs to the same domain (100) as the owner of the content since the person (505) does not.

This may be done by checking if the portable device (507) is bound to the same domain as the content item as described in connection with FIG. 5. After validation of the device, then the content item may be accessed by the user on the portable device (507).

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of generating an Authorized Domain (AD), the method comprising:
   selecting a domain identifier uniquely identifying the Authorized Domain;
   directly binding at least one user to the domain identifier;
   obtaining a number of devices and a number of users that are authorized to access a content item of said Authorized Domain, wherein the obtaining step comprises:
      binding at least one device to a plurality of users that includes the at least one user, such that the at least one device is directly linked to the at least one user and is indirectly linked to the domain identifier through the at least one user, by
         obtaining or generating a Device Owner List for each device to be bound, the Device Owner List comprising a unique identifier for the device to be bound and unique identifiers for the plurality of users, thereby defining that the device is directly bound to the at least one user, and the Device Owner List implemented as or included in a Device Owner Certificate issued by a domain authority of the Authorized Domain; and
   allowing access to the content item by a given user and/or other users operating a given device that are not directly linked to the content item if the given user and a user to which the content item is linked belong to the same Authorized Domain.

2. The method according to claim 1, one user of the plurality of users is indicated as a primary user for the given device.

3. The method according to claim 2, further comprising importing, on the given device, at least one content item into the Authorized Domain given by the domain identifier by automatically binding, by default, the at least one imported content item to the user indicated as primary user for the given device, or binding the at least one imported content item to another user using additional information, when non-default binding is to be used.

4. The method according to claim 1, further comprising providing an Authorized Domain size limitation, where the limitation relates to a maximum number of users.

5. The method according to claim 1, further comprising using at least one of:
   a user identification device as a personal Authorized Domain manager;
   a personal mobile device as a personal Authorized Domain manager;
   a mobile phone as a personal Authorized Domain manager; and
   a PDA (personal digital assistant) as a personal Authorized Domain manager.

6. The method according to claim 1, wherein the binding of at least one user to the domain identifier comprises obtaining or generating a Domain Users List comprising the domain identifier and a unique identifier for a user thereby defining that the user is bound to the Authorized Domain.

7. The method according to claim 1, further comprising binding at least one content item to the Authorized Domain by binding a content item to a User Right, where the User Right is bound to a user bound to the Authorized Domain.

8. The method according to claim 7, wherein the User Right comprises rights data representing which rights exists in relation to the at least one content item bound to the User Right.

9. The method according to claim 7, wherein allowing access to the content item comprises checking that the User Right for the given content item specifies that the given user has the right to access the given content item and only allowing access to the given content item in the affirmative.

10. The method according to claim 1, wherein every content item is encrypted and a content right is bound to each content item and to a User Right, and the content right of a given content item comprises a decryption key for decrypting the given content item.

11. The method according to claim 7, wherein the Domain Users List is implemented as or included in a Domain Users Certificate, and/or a User Right is implemented as or included in a User Right Certificate.

12. The method according to claim 1, further comprising binding at least one content item to at least one user.

13. A system for generating an Authorized Domain, the system comprising:
   means for obtaining a domain identifier uniquely identifying the Authorized Domain;
   means for directly binding at least one user to the domain identifier;
   means for obtaining a number of devices and a number of users that are authorized to access a content item of said Authorized Domain, wherein the means for obtaining comprises:
      means for binding at least one device to a plurality of users that includes the at least one user, such that the at least one device is directly linked to the at least one user and is indirectly linked to the domain identifier through the at least one user, by
         obtaining or generating a Device Owner List for each device to be bound, the Device Owner List comprising a unique identifier for the device to be bound and unique identifiers for the plurality of users thereby defining that the device is directly bound to the at least one user, and the Device Owner List implemented as or included in a Device Owner Certificate issued by a domain authority of the Authorized Domain; and
   means for allowing access to the content item by a given user and/or other users operating a given device that are not directly linked to the content item if the given user and a user to which the content item is linked belong to the same Authorized Domain.

14. The system according to claim 13, wherein one user of the plurality of users is indicated as a primary user for that particular device.

15. The system according to claim 14, further comprising means for importing, on a given device, at least one content item into the Authorized Domain given by the domain identifier by automatically binding, by default, the at least one imported content item to the user indicated as primary user for the given device, or binding the at least one imported content item to another user using additional information, when non-default binding is to be used.

16. The system according to claim 13, further comprising means for providing an Authorized Domain size limitation, where the limitation relates to a maximum number of users.

17. The system according to claim 13, further comprising at least one of:
- means for using a user identification device as a personal Authorized Domain manager;
- means for using a personal mobile device as a personal Authorized Domain manager;
- means for using a mobile phone as a personal Authorized Domain manager; and
- means for using a PDA (personal digital assistant) as a personal Authorized Domain manager.

18. The system according to claim 13, wherein the means for binding at least one user to the domain identifier is adapted to obtain or generate a Domain Users List comprising the domain identifier and a unique identifier for a user, thereby defining that the user is bound to the Authorized Domain.

19. The system according to claim 13, wherein the means for binding at least one content item to the Authorized Domain is adapted to bind a content item to a User Right, where said User Right is bound to a user bound to the Authorized Domain.

20. The system according to claim 19, wherein the User Right comprises rights data representing which rights exists in relation to the at least one content item bound to the User Right.

21. The system according to claim 19, wherein the means for allowing access to the content item is further adapted to check that the User Right for the given content item specifies that the given user has the right to access the given content item and only allow access to the given content item in the affirmative.

22. The system according to claim 13, wherein every content item is encrypted and a content right is bound to each content item and to a User Right, and the content right of a given content item comprises a decryption key for decrypting the given content item.

23. The system according to claim 18, wherein the Domain Users List is implemented as or included in a Domain Users Certificate, and/or a User Right is implemented as or included in a User Right Certificate.

24. A nontransitory computer-readable storage medium having stored thereon instructions for causing one or more processing units to execute actions comprising:
- selecting a domain identifier uniquely identifying the Authorized Domain directly binding at least one user to the domain identifier;
- obtaining a number of devices and a number of users that are authorized to access a content item of said Authorized Domain, wherein the obtaining step comprises:
  - binding at least one device to a plurality of users that includes the at least one user, such that the at least one device is directly linked to the at least one user and is indirectly linked to the domain identifier through the at least one user, by
    - obtaining or generating a Device Owner List for each device to be bound, the Device Owner List comprising a unique identifier for the device and unique identifiers for the plurality of users, thereby defining that the device is directly bound to the at least one user, and the Device Owner List implemented as or included in a Device Owner Certificate issued by a domain authority of the Authorized Domain; and
- allowing access to the content item by a given user and/or other users operating a given device that are not directly linked to the content item if the given user and a user to which the content item is linked belong to the same Authorized Domain.

* * * * *

UNITED STATES PATENT AND TRADEMARK OFFICE
CERTIFICATE OF CORRECTION

PATENT NO. : 8,863,239 B2
APPLICATION NO. : 10/599272
DATED : October 14, 2014
INVENTOR(S) : Lenoir et al.

It is certified that error appears in the above-identified patent and that said Letters Patent is hereby corrected as shown below:

On the Title Page, Item (75), lines 4-5,
"Sebastiaan Antonius Fransiscus Van Den Heuvel, Eindhoven (NL);" should read --Sebastiaan Antonius Fransiscus Arnoldus Van Den Heuvel, Eindhoven (NL);"--.

On the Title Page, Item (75), line 6,
"Robert Paul Koster, Einhoven (NL)" should read --Robert Paul Koster, Eindhoven (NL)--.

On the Title Page, Item (57), line 2,
"Authorized Domain (AI))," should read --Authorized Domain (AD),--.

On the Title Page, Item (57), line 7,
"(P1, P2, . . . , PN1)," should read --(P1, P2, . . . , $PN_1$),--.

On the Title Page, Item (57), line 8,
"(P1, P2, . . . , PN1)" should read --(P1, P2, . . . , $PN_1$)--.

On the Title Page, Item (57), line 9,
"that is authorized" should read --that are authorized--.

On the Title Page, Item (57), line 12,
"(P1, P2, . . . , PN1) that is authorized" should read --(P1, P2, . . . , $PN_1$) that are authorized--.

On the Title Page, Item (57), line 13,
"is obtained." should read --are obtained.--.

In the Claims

Claim 2, column 15, line 41,
"claim 1, one user" should read --claim 1, wherein one user--.

Signed and Sealed this
Second Day of June, 2015

Michelle K. Lee
*Director of the United States Patent and Trademark Office*

Claim 8, column 16, line 8,
"which rights exists" should read --which rights exist--.

Claim 20, column 17, line 25,
"which rights exists" should read --which rights exist--.